May 31, 1938. V. T. PALMER 2,119,052
RESILIENT MOUNT FOR AUTOMOBILE WHEELS
Filed Oct. 5, 1936
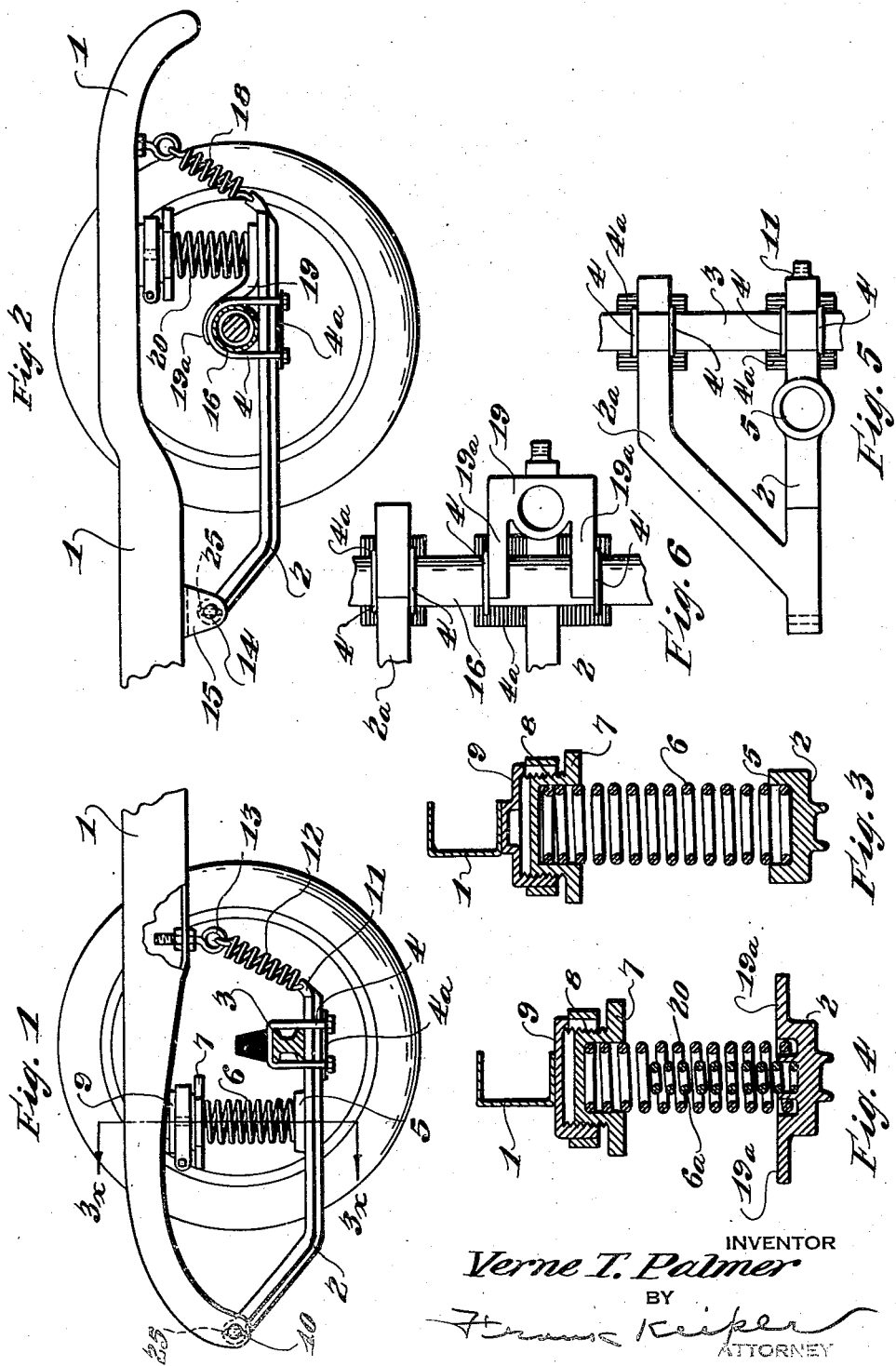

Patented May 31, 1938

2,119,052

UNITED STATES PATENT OFFICE 2,119,052

RESILIENT MOUNT FOR AUTOMOBILE WHEELS

Verne T. Palmer, Tuscarora, N. Y.

Application October 5, 1936, Serial No. 103,982

2 Claims. (Cl. 267—20)

The object of this invention is to provide a mount for the wheels of an automobile that will make them more resilient for the purpose of absorbing shocks, so that the shocks will not be communicated to the frame of the car.

These and other objects of the invention will be illustrated in the drawing, described in the specification, and pointed out in the claims at the end thereof.

In the drawing:

Figure 1 is a side elevation of the front wheel and a portion of the frame, viewed from the inside, the front axle being shown in section.

Figure 2 is a side elevation of a rear wheel and a portion of the frame of the car, viewed from the inside, the axle and its housing being shown in section.

Figure 3 is a vertical section through the supporting spring and parts associated therewith, the section being taken on the line $3x$—$3x$ of Figure 1.

Figure 4 shows a vertical section through the supporting spring and the parts associated therewith, the supporting spring being supplemented by a reinforcing spring.

Figure 5 is a top plan view of the auxiliary frame that is supported from the front axle.

Figure 6 is a top plan view of the auxiliary frame that is supported from the housing of the rear axle.

In the drawing like reference numerals indicate like parts.

In the drawing reference numeral 1 indicates one of the side bars or channel members of the reach frame of the car. 2 indicates an auxiliary frame which extends under the front axle 3, from which it is supported by the U-bolts 4, 4 and plate 4a. On this frame is provided a seat 5, on which rests a helical spring 6 under compression. The upper end of this spring supports a flanged cap 7. This cap is threaded on the outside with a male thread 8. Over this cap 7 is provided a cap 9 having a female thread therein that engages with the male thread on the cap 8. The cap 9 is adjustable on the cap 8. On top of the cap 9 rests the channel shaped member of the frame of the car.

The forward end of the auxiliary frame 2 is pivotally connected at 10 to the forward end of the main frame 1. The frame 2 is hung from the front axle 3 by the U-bolts 4, 4 and plate 4a. Two U-bolts are provided, one on each side of the member 2 of the auxiliary frame. The rear end 11 of the auxiliary frame, as shown in Figure 1, is connected by a helical spring 12 under tension to an eye-bolt 13 provided at a suitable point on the member 1.

When the front wheel hits an obstruction, the springs 6 and 12 act to take up all or nearly all of the shock, so that the shock is not communicated to the frame of the car or to its passengers.

As shown in Figure 2, the forward end of the auxiliary frame 2 is pivotally connected at 14 to a lug 15 fastened to the frame 1 at some point forward of the axle housing. The frame 2 is supported from the housing 16 of the rear axle by U-bolts 4, and the rear end of the frame 2 is connected by a helical tension spring 18 to the rear end of the frame 1.

A plate 19 is provided resting on the frame 2. This plate has two arms 19a, 19a engaging over the axle housing between the U-bolts. Resting on a seat provided in the plate 19 is provided a helical compression spring 20, which is interposed between the auxiliary frame and the main frame. The springs 6 and 20, which are under compression, give somewhat and the springs 12 and 18, which are under tension, give to some extent so that the shock communicated to the wheel and its axle in each case is not communicated directly to the frame of the car and the shock that is communicated to the frame and passengers in the car is therefore much lessened.

Each auxiliary frame 2 has a side arm 2a that is fastened either to the axle or the axle housing by U-bolts 4, 4 and a plate 4a. By this side arm each auxiliary frame is held in proper relation to the axle which supports it.

As shown in Figure 4, an auxiliary spring 6a is provided inside of the main spring 6. This auxiliary spring helps to take the load and absorb the shock if it is exceptionally violent.

It will also be seen that while the bolt making the connection at 10 is cylindrical, it works in an oval slot 25 in the frame 1, the long axis of which slot is vertical, or up and down. This permits the auxiliary frame at the front to give up and down with reference to the main frame, and the give can be on either side of the car independent of the other side.

I claim:

1. In a mount for a wheel of an automobile, the combination of a main frame, a rigid auxiliary frame pivoted at one end thereof to the main frame, the main frame having an oval slot therein in which the pivotal connection can rise and fall with the auxiliary frame, a car axle, positive connections between the car axle and the auxiliary frame, a compression spring interposed between the auxiliary frame and the main frame at one side of the axle, a tension spring connecting the auxiliary frame to the main frame, a bracket extending laterally from the auxiliary frame and fastened to the axle to prevent tilting of the auxiliary frame sideways relative to the axle, said auxiliary frame being free to rock on its pivoted end as the axle and the main frame move toward and away from each other either in parallel or in non-parallel relation.

2. In a mount for a wheel of an automobile, the combination of a main frame, the main frame having an oval slot therein in which the pivotal connection can rise and fall with the auxiliary frame, an auxiliary frame pivoted at one end thereof to the main frame, means connecting two of the wheels together axially, positive connections between the connecting means and the auxiliary frame, a compression spring interposed between the auxiliary frame and the main frame at one side of the axle, a tension spring connecting the auxiliary frame to the main frame, a bracket extending laterally from the auxiliary frame and fastened to the axle to prevent tilting of the auxiliary frame sideways relative to the axle, said auxiliary frame being free to rock on its pivoted end as the axle and the main frame move toward and away from each other either in parallel or in non-parallel relation.

VERNE T. PALMER.